United States Patent
Zhu et al.

(10) Patent No.: US 11,733,925 B2
(45) Date of Patent: Aug. 22, 2023

(54) ENABLING MULTIPLE DATA CAPACITY MODES AT A MEMORY SUB-SYSTEM

(71) Applicant: MICRON TECHNOLOGY, INC., Boise, ID (US)

(72) Inventors: Fangfang Zhu, San Jose, CA (US); Chih-Kuo Kao, Fremont, CA (US); Jiangli Zhu, San Jose, CA (US); Ying Yu Tai, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/461,759

(22) Filed: Aug. 30, 2021

(65) Prior Publication Data

US 2023/0062189 A1    Mar. 2, 2023

(51) Int. Cl.
     *G06F 3/06*          (2006.01)
(52) U.S. Cl.
     CPC .......... *G06F 3/0659* (2013.01); *G06F 3/0604* (2013.01); *G06F 3/0653* (2013.01); *G06F 3/0679* (2013.01)
(58) Field of Classification Search
     CPC .... G06F 3/0659; G06F 3/0604; G06F 3/0653; G06F 3/0679; G06F 3/0635; G06F 3/0634; G06F 12/06
     See application file for complete search history.

(56) References Cited

PUBLICATIONS

Liang et al "Improving Read Performance of SSDs via Balanced Redirected Read". Added to IEEE Xplore Aug. 25, 2016. Retrieved from the Internet Oct. 18, 2022; <Retrieved from URL: https://ieeexplore.ieee.org/document/7549406?source=IQplus> (Year: 2016).*

* cited by examiner

*Primary Examiner* — David Yi
*Assistant Examiner* — Dustin B. Fulford
(74) *Attorney, Agent, or Firm* — Lowenstein Sandler LLP

(57) ABSTRACT

A request to program a set of host data items to management units (MUs) of a fault tolerant stripe associated with a memory sub-system is received. A set of memory access operations to be executed at the MUs of the fault tolerant stripe in accordance with the received request is determined. The set of memory access operations include one or more read operations to read data from the MUs of the fault tolerant stripe. The set of memory access operations also include one or more write operations to write the set of host data items and redundancy metadata associated with the set of host data items to MUs of the fault tolerant stripe. A first series of commands corresponding to the one or more read operations of the set of memory access operations is executed. The redundancy metadata associated with the set of host data items is generated based on the data read from the MUs of the fault tolerant stripe during execution of the first series of commands and the set of host data items. A second series of commands corresponding to the one or more write operations of the set of memory access operations is executed.

20 Claims, 5 Drawing Sheets

ENABLING MULTIPLE DATA CAPACITY MODES AT A MEMORY SUB-SYSTEM

TECHNICAL FIELD

Embodiments of the disclosure relate generally to memory sub-systems, and more specifically, relate to enabling stripe-based operations for enabling multiple data capacity modes at a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
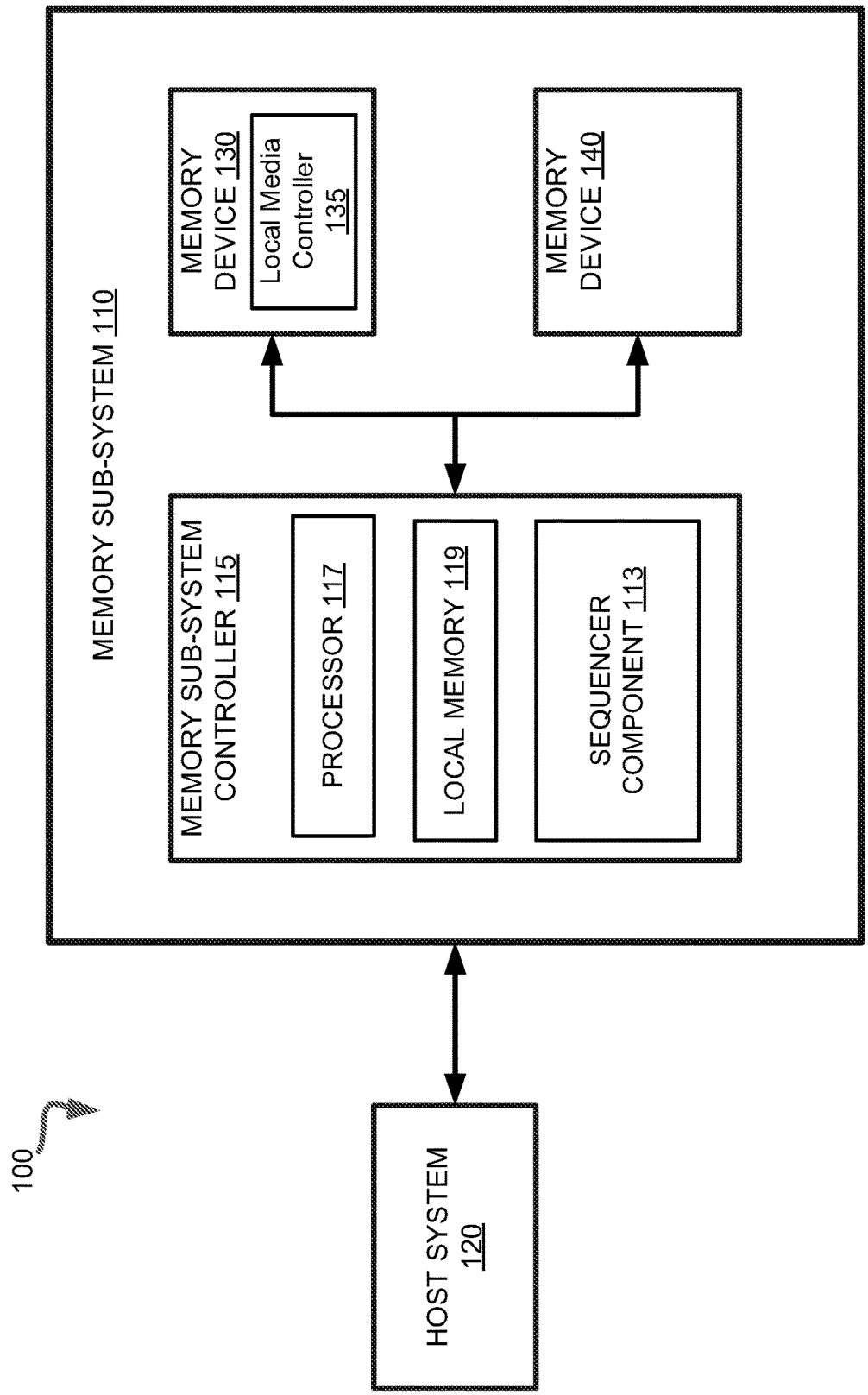
FIG. 1 illustrates an example computing system that includes a memory sub-system, in accordance with some embodiments of the present disclosure.

Aspects of the present disclosure are directed to enabling multiple data capacity modes at a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. An example of a "block" is an "erasable block," which is the minimal erasable unit of memory, while "page" is a minimal writable unit of memory. Each page includes a set of memory cells. A memory cell is an electronic circuit that stores information. Some types of memory, such as 3D cross-point, can group pages across dice and channels to form management units (MUs) (also referred to as logical units (LUNs)). A MU can correspond to a page, a block, etc. In some instances, a group of MUs that are grouped together for management purposes can be referred to as a super MU (SMU).

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell may be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include a logical address (e.g., a logical block address (LBA) and namespace) for the host data, which is the location that the host system associates with the host data. The logical address information (e.g., LBA, namespace) can be part of metadata for the host data.

A memory sub-system controller can access data at a memory device via a memory channel. A memory channel (also referred to as a data channel or simply a channel herein) refers to a connection (e.g., a BUS) between the memory sub-system controller and portion of a respective memory device of a memory sub-system. A signal including data that is to be programmed to or read from a portion of a memory device can be transmitted between the memory sub-system controller and the memory cells of the portion of the memory device via the channel. Some memory sub-systems can include a sequencing device (referred to as a sequencer device or a sequencer herein), which can manage memory access operations across one or more data channels of the memory sub-system. For example, a sequencer can execute a sequence of memory access operations across one or more channels of the memory sub-system.

Some memory sub-systems can configure multiple memory devices (e.g., memory dies) per a channel in a multi-channel arrangement. In such systems, a memory sub-system controller can include or be connected to multiple sequencers, which are each connected to multiple channels configured to transmit data to and from a respective portion of a memory device. The memory sub-system controller can received a request (e.g., from a host system) to access data at one or more portions of a memory sub-system. The memory sub-system controller can identify a portion of the memory device associated with the data and can execute one or more commands to access the data via a channel that is connected to the identified portion. In some instances, the memory sub-system can transmit the one or more instructions or commands to each sequencer connected to the memory sub-system controller. The sequencer that is to facilitate the transmission of the data via the data channel can be enabled, e.g., in view of an enable bit of the instruction or command. In other instances the memory sub-system controller can transmit the one or more instructions or commands to the sequencer for the channel that is connected to the identified portion of the memory sub-system.

As computing systems become more ubiquitous, different host systems can utilize different types of memory sub-systems that have different storage capacities and/or consume different amounts of power. For example, a memory sub-system associated with a host system at a data storage platform can have a significantly large storage capacity (i.e., and can consume a significant amount of power), while a memory sub-system associated with a host system for a user device (e.g., a mobile device, a wearable device, etc.) can have a smaller storage capacity (and can consume a smaller amount of power). A memory sub-system that has a large storage capacity can include a significant number of memory devices, and therefore can include a significant number of data channels, while a memory sub-system that has a smaller storage capacity can include a smaller number of memory devices, and therefore a smaller number of data channels. In order to enable memory access for data residing at memory sub-systems with differing storage capacities, the memory sub-system controller at each memory sub-system is to be configured to execute commands according to the distinct architecture associated with the number of memory devices and data channels at the respective memory sub-system. There can be hundreds and in some instances thousands of distinct architecture configurations of memory sub-systems associated with different storage capacities. Accordingly, hundreds or thousands of distinct memory access protocols can be developed to support such distinct architecture configurations. Developing such memory access protocols can take a significant amount of time and can consume a significant amount of computing resources (e.g., to develop each protocol, to test each protocol, to install each protocol, etc.). Such computing resources are therefore not available for other processes, which can increase an overall latency and can decrease an overall efficiency of a computing system.

Aspects of the present disclosure address the above and other deficiencies by enabling multiple data capacity modes at a memory sub-system. In some embodiments, a memory sub-system can be associated with a set of logical data channels (referred to as logical channels herein). A number of the set of logical channels can correspond to a maximum number of data channels (referred to as physical data channels or physical channels herein) that can be associated with a memory sub-system, e.g., in view of a number of partitions associated with a respective memory device of the memory sub-system. A partition refers to a portion or section of a memory device which is associated with a single host application or execution thread. In an illustrative example, a respective memory device can include 16 partitions. Accordingly, the maximum number of physical channels that can be associated with the memory sub-system (i.e., and the number of the set of logical channels for the memory sub-system) can be 16.

In some embodiments, the number of physical channels of a memory sub-system can correspond to the number of the set of logical channels. In other or similar embodiments, the number of physical channels of the memory sub-system can be fewer than the number of the set of logical channels. In another illustrative example, a respective memory device can include 16 partitions, however, the memory sub-system can include 8 physical channels (i.e., one physical channel per two partitions). A memory sub-system can operate in a full capacity mode when the number of physical channels corresponds to the number of the set of logical channels, and the memory sub-system controller is configured to access data via each of the physical channels. A memory sub-system can operate in a reduced capacity mode when the number of physical channels is fewer than the number of the set of logical channels, or the memory sub-system controller is configured to access data via a portion of the physical channels of the memory sub-system. The memory sub-system controller can detect whether the memory sub-system is operating in the full capacity mode or the reduced capacity mode in view of one or more settings associated with the memory sub-system, which can be provided, for example, during an installation and/or an initialization of the memory devices at the memory sub-system.

The memory sub-system controller can receive a request (e.g., from a host system) to access data at a memory device of the memory sub-system. For illustrative purposes, the request is described to be a request to program the data to a portion of the memory device. However, the request can be a request to access data programmed to the memory device (i.e., a read request), in some embodiments of the present disclosure. The memory sub-system controller can determine a portion of a memory device that is to store the data of the request (e.g., based on a logical address and/or a physical address associated with the data). The memory sub-system controller can also determine a logical channel that is associated with the determined portion of the memory device (e.g., based on memory sub-system data obtained during installation and/or initialization of the memory devices at the memory sub-system). The memory sub-system controller can generate an instruction to program the data to the determined portion of the memory device and can transmit the instruction to one or more sequencers of the memory sub-system. In accordance with embodiments of the present disclosure, a sequencer can refer to a sequencer device, which can be connected to the memory sub-system controller (e.g., via a BUS). In additional or alternative embodiments of the present disclosure, the sequencer can refer to a component (e.g., a software component) of the memory sub-system controller or a local media controller associated with one or more memory devices.

The sequencer can determine whether the memory sub-system is operating in the full capacity mode or the reduced capacity mode (e.g., in view of the one or more settings associated with the memory sub-system). In response to determining that the memory sub-system is operating in the full capacity mode, the sequencer can execute a memory access operation to program the data to the determined portion of the memory device via a physical channel that corresponds to the logical channel, in accordance with the received instruction. In response to determining that the memory sub-system is operating in the reduced capacity mode, the sequencer can identify a physical channel that corresponds to the logical channel of the received instruction (e.g., in view of a mapping associated with the logical channel). Responsive to determining that the identified physical channel correspond to an additional portion of the memory device, or a portion of an additional memory device of the memory sub-system, the sequencer can update the memory address associated with the data to indicate the additional portion of the memory device or the portion of the additional memory device. The sequencer can then execute a memory access operation to program the data to memory cells that correspond to the updated memory address via the identified physical channel.

Advantages of the present disclosure include, but are not limited to, providing a scheme that enables multiple data capacity modes at a memory sub-system. As indicated above, embodiments of the present disclosure provide that a memory sub-system controller can execute instructions to perform memory access operations via each of a set of logical channels associated with a memory system, which correspond to a maximum number of physical channels that can be included at the memory sub-system controller. Responsive to determining that the memory sub-system is operating in a reduced capacity mode, a sequencer associated with the memory sub-system can update an address associated with the executed instructions to correspond to a portion of the memory device that stores the data (or is to store the data) instead of a portion of a memory device associated with the logical channel. Accordingly, a memory sub-system controller can implement the same memory access protocol regardless of the storage capacity and/or architecture of the memory sub-system. By implementing the same memory access protocol, multiple distinct memory access protocols are not developed to support distinct architecture configurations, which can reduce an amount of time and computing resources that are spent to configure a memory sub-system. Such computing resources can be made available to other processes, which can decrease an overall latency and increase an overall efficiency for a computing system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a sequencer component 113. In some embodiments, the memory sub-system controller 115 includes at least a portion of the sequencer component 113. For example, the memory sub-system controller 115 can include a processor 117 (processing device) configured to execute instructions stored in local memory 119 for performing the operations described herein. In some embodiments, the sequencer component 113 is part of the host system 120, an application, or an operating system.

In other or similar embodiments, sequencer component 113 can include one or more sequencer devices that reside between memory sub-system controller 115 and memory devices 130, 140. In one example, memory sub-system 110 can include a single sequencer device that connects to each memory device 130, 140 via one or more physical channels. In another example, the number of sequencer devices at memory system 110 can depend on a number of physical channels connected to a respective memory device 130, 140, a channel capacity associated with the sequencer device, and/or a sequencer capacity associated with memory sub-system 110. In one example, each memory device can include 16 partitions and each partition can be connected to a respective physical channel (i.e., 16 total physical channels). Memory sub-system 110 can include eight sequencer devices, where each sequencer device is configured to support two physical channels. In another example, each memory device can include 16 partitions and multiple partitions (e.g., two partitions) can be connected to the same respective physical channel (e.g., eight total physical channels). Memory sub-system 110 can include eight sequencer devices, where each sequencer device is configured to support a single physical channel, in some embodiments. In alternative embodiments, memory sub-system 110 can include four sequencer devices, where each sequencer device is configured to support two physical channels. In some embodiments, each sequencer device of memory sub-system 110 can include a component (e.g., a multiplexer device) that is configured to transmit data signals between memory sub-system controller 115 and memory devices 130, 140. In additional or alternative embodiments, each sequencer device can include a processing device configured to execute instructions (e.g., received from memory sub-system controller 115).

Sequencer component 113 can be configured to enable multiple data capacity modes at memory sub-system 110. During an installation and/or an initialization of memory sub-system 110, memory sub-system controller 115 can receive an indication of a capacity mode setting associated with memory sub-system 110. The capacity mode setting can include an indication of whether memory sub-system 110 is to operate in a full capacity mode or a reduced capacity mode, as described above. During a runtime of memory sub-system 110, memory sub-system controller 115 can receive a request (e.g., from host system 110) to access data at a memory device 130, 140. Memory sub-system controller 115 can determine a portion of a memory device 130, 140 that is to store the data of a request and a logical channel that is associated with the determined portion of the memory device 130, 140. Memory sub-system controller 115 can generate an instruction to access the data at the determined portion of the memory device and can provide (e.g., transmit) the instruction to sequencer component 113, as described above.

Sequencer component 113 can determine whether memory sub-system 110 is operating in the full capacity mode or the reduced capacity mode, in view of the capacity mode setting, and can execute a memory access operation at a portion of a memory device 130, 140 in accordance with the determination. For example, in response to determining that memory sub-system 110 is operating in the full capacity mode, sequencer component 113 can execute a memory access operation to access the data at the portion of the memory device 130, 140 (i.e., determined by memory sub-system controller 115), via a physical channel that corresponds to the logical data channel. In another example, in response to determining that memory sub-system 110 is operating in the reduced capacity mode, sequencer component 113 can determine a physical channel that corresponds to the logical data channel and, in some instances, can identify an additional portion of the memory device 130, 140, or a portion of an additional memory device 130, 140, that is connected to the physical channel. Sequencer component 113 can update the address associated with the data to indicate the additional portion of memory device 130, 140, or the portion of the additional memory device 130, 140, and can execute a memory access operation to access the data at a set of memory cells that correspond to the updated address. Further details regarding the sequencer component 113 are provided herein.

Figure 2:
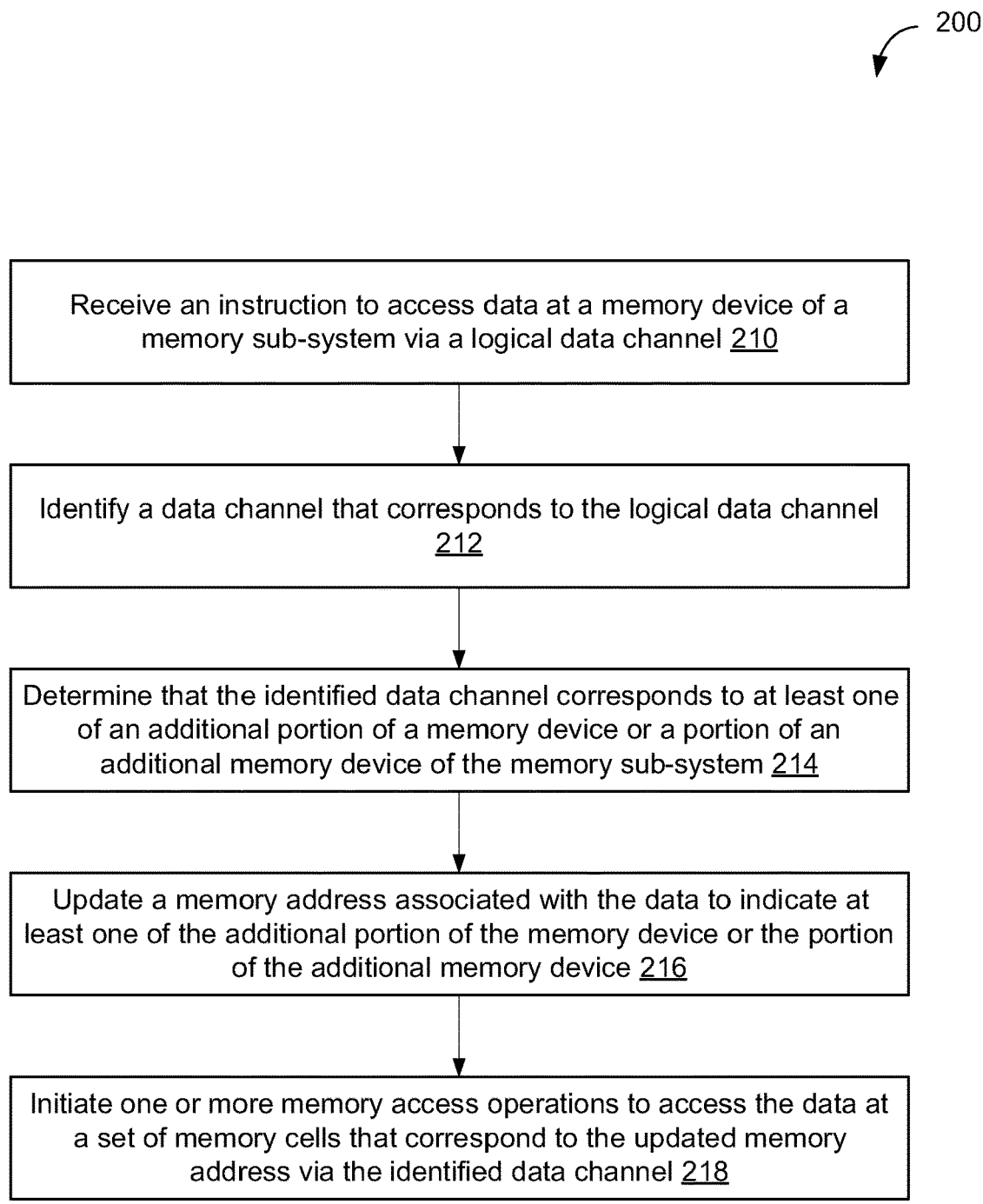
FIG. 2 is a flow diagram of an example method for accessing memory at a memory sub-system operating in a reduced data capacity mode, in accordance with some embodiments of the present disclosure.

FIG. 2 is a flow diagram of an example method 200 for accessing memory at a memory sub-system operating in a reduced data capacity mode, in accordance with embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the sequencer component 113 of FIG. 1. In other or similar embodiments, one or more operations of method 200 is performed by another component of the memory sub-system controller 115, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3:
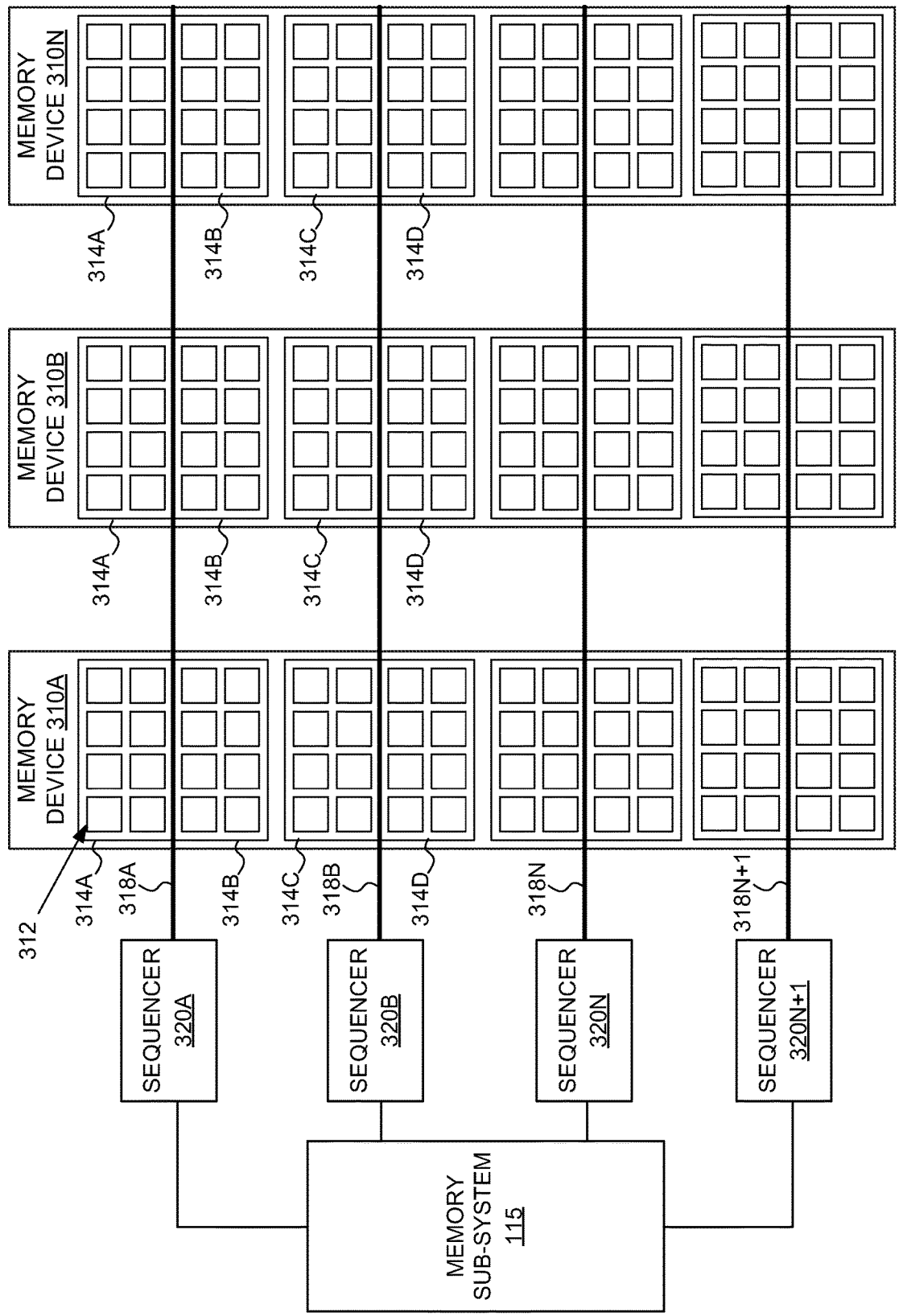
FIG. 3 depicts an example of operating in a reduced data capacity mode, in accordance with some embodiments of the present disclosure.

At block 210, processing logic receives an instruction to access data at a memory device of a memory sub-system via a logical data channel. FIG. 3 illustrates example memory devices 310 connected to a memory sub-system (e.g., memory sub-system 115 of FIG. 1). In some embodiments, memory devices 310 (e.g., memory device 310A, 310B, and/or 310N) can correspond to a memory device 130, 140. Each memory device 310 can include memory cells 312, which are each associated with a respective portion of memory device 310. For example, a set of memory cells 312 at a memory device 310 can be associated with a partition 314 of the memory device 310. In some embodiments, each memory device 310 can include one or more partitions 314. For illustrative purposes, memory devices 310 can each include 8 partitions, as illustrated in FIG. 3. However, it should be noted that memory devices 310 can include any number of partitions (e.g., 16 partitions, 32 partitions, etc.), in accordance with embodiments of the present disclosure.

One or more partitions 314 of a respective memory device 310 can be connected to a physical channel 318, in accordance with previously described embodiments. In some embodiments, a respective physical channel 318 can be connected to a corresponding partition 314 across one or more of memory devices 310. For example, in some embodiments (not illustrated), a first physical channel 318 can be connected to each first partition 314 of memory devices 310A, 310B, and/or 310N, a second physical channel 318 can be connected to each second partition 314 of memory devices 310A, 310B, and/or 310N, and so forth. In such embodiments, the number of physical channels 318 included at memory sub-system 110 can correspond to the number of partitions included at a respective memory device 310 (e.g., eight physical channels (not shown) for the eight partitions depicted in FIG. 3). In other or similar embodiments, a respective physical channel 318 can be connected to multiple corresponding partitions 314 across one or more of memory devices 310, For example, as illustrated in FIG. 3, channel 318A can be connected to partitions 314A and partitions 314B of memory devices 310A, 310B, and/or 310N, channel 318B can be connected to partitions 314C and partitions 314D of memory devices 310A, 310B, and/or 310N, and so forth. In such embodiments, the number of physical channels included at memory sub-system 110 can be less than the number of partitions included at the respective memory device 310 (e.g., four physical channels for the eight partitions depicted in FIG. 3).

In some embodiments, memory sub-system 110 can be associated with a set of logical channels. The number of the set of logical channels can correspond to the maximum number of channels that can be associated with memory sub-system 110, e.g., in view of a number of partitions that can be associated with a respective memory device 310 of memory sub-system 110. In an illustrative example, the number of partitions associated with a respective memory device 310 can be eight, as illustrated in FIG. 3. Accordingly, the maximum number of channels that can be associated with memory sub-system 110 can be eight total channels (i.e., one channel for each partition of memory device 310), and therefore the number of the set of logical channels can be eight logical channels. In some embodiments, each logical channel can be associated with a respective partition of memory devices 310. For example, a first logical channel associated with memory sub-system 110 can be associated with partition 314A, a second logical channel can be associated with partition 314B, and so on. In some embodiments, a component of memory sub-system controller 115 (e.g., sequencer component 113) can generate a mapping that associates logical channel with a respective partition (e.g., during or after an initialization of memory sub-system 110) and can store the mapping at a memory of memory sub-system controller 115 (e.g., at local memory 119, at a memory device 310, etc.).

As described above, memory sub-system 110 can operate in a full capacity mode or a reduced capacity mode. Memory sub-system 110 can operate in the full capacity mode when the number of physical channels corresponds to the number of the set of logical channels, and the memory sub-system controller is configured to access data via each of the physical channels. In accordance with at least one illustrative example, memory sub-system 110 can be associated with eight logical channels (e.g., in view of eight partitions at each memory device 310) and memory sub-system 110 can include eight physical channels (not illustrated). Memory sub-system 110 controller can be configured to access data via each of the eight physical channels (e.g., so long as none of the physical channels is disconnected, damaged, or otherwise unavailable). In such example, memory sub-system 110 can operate in the full capacity mode (i.e., because the number of logical channels corresponds to the number of physical channels at the memory device 110) to access data at memory devices 310 via each of the eight physical channels, in accordance with embodiments described herein.

Memory sub-system controller 110 can operate in the reduced capacity mode when the number of physical channels is fewer than the number of the set of logical channels, or the memory sub-system controller is configured to access data via a portion of the physical channels of the memory sub-system. In accordance with at least one additional or alternative illustrative example, memory sub-system 110 can be associated with eight logical channels (e.g., in view of eight partitions at each memory device 310) and memory sub-system 110 can include four physical channels 318, as illustrated in FIG. 3. Accordingly, memory sub-system 110 can operate in the reduced capacity mode (i.e., because the number of physical channels at memory sub-system 110 is less than the number of logical channels) to access data at memory devices 310 via each of the four physical channels 318, in accordance with embodiments described herein.

As indicated above, memory sub-system 110 can include one or more sequencers 320 that are connected to memory devices 310 via one or more physical channels 318. The number and/or configuration of sequencers 320 at memory sub-system 110 can depend on a number of physical channels connected to a respective memory device 310, a channel capacity associated with the sequencer 320, and/or a sequencer capacity associated with memory sub-system 110, as described above. As illustrated in FIG. 3, memory sub-system 110 can include four sequencers 320 (i.e., sequencer 320A, 320B, 320N, and 320N+1) where each sequencer 320 is connected to memory devices 310 via a single physical channel 318. It should be noted that memory sub-system 110 can include additional or fewer sequencers 320 according to alternative configurations (e.g., eight sequencers 320 that are each connected to memory devices 310 via a single physical channel, two sequencers 320 that are connected to memory devices 310 via multiple physical channels 318, etc.). As indicated above, sequencer component 113 can be a component of memory sub-system controller 115 and/or can be included at one or more of sequencers 320, in some embodiments.

As described above, sequencer component 113 can receive an instruction (e.g., at block 210 of method 200) to access data at a memory device 310 of memory sub-system 110 via a logical data channel. In some embodiments, memory sub-system controller 115 can receive a request to access data (e.g., host data) at a memory device 310. Memory sub-system controller 115 can determine a partition 314 of a memory device 310 associated with the data of the request (e.g., in view of a logical address and/or a physical address associated with the data). In some embodiments, memory sub-system controller 115 can identify a logical channel associated with the determined partition 314 of the memory device 310, for example, using a mapping stored at memory of memory sub-system 110, as described above. Responsive to identifying the logical channel associated with the determined partition 314, memory sub-system controller 115 can provide the instruction to sequencer component 113 to access the data at the determined partition 314 of the memory device 310 via the identified logical channel.

At block 212, processing logic can identify a physical channel (e.g., channel 318) that corresponds to the logical channel indicated in the received instruction. In some embodiments, sequencer component 113 can maintain a data structure that indicates a mapping between each logical channel associated with the memory sub-system 110 and a respective physical channel 318 of memory sub-system 110. Sequencer component 113 can generate each mapping, for example, during an installation and/or initialization of memory sub-system 110, as described above. Responsive to receiving the instruction from memory sub-system controller 115, sequencer component 113 can identify a mapping that corresponds to the logical channel indicated by the instruction and can determine the physical channel 318 associated with the logical channel based on the identified mapping.

In additional or alternative embodiments, sequencer component 113 can identify a physical channel that corresponds to the logical channel by providing an indication of the portion of the memory device associated with the data as input to a function. The function can be configured to determine a portion of the memory device that stores, or is to store, data when the memory sub-system 110 is operating in a reduced capacity mode. In some embodiments, the portion determined using the function can correspond to the portion indicated in the received instruction. In other or similar embodiments, the determined portion can correspond to an additional portion of the memory device 310 indicated in the received instruction, or a portion of an additional memory device 310 of the memory sub-system. Sequencer component 113 can obtain one or more outputs of the function and determine the partition 314 of a memory device 310 that stores, or is to store, the data of the instruction. Sequencer component 113 can identify the physical channel 318 that is connected to the determined partition 314.

At block 214, processing logic can determine that the identified data channel corresponds to at least one of an additional portion of a memory device 310 or a portion of an additional memory device 310 of the memory sub-system. As indicated above, in some embodiments, processing logic (e.g., sequencer component 113) can identify the physical channel 318 associated with the logical channel based on a mapping stored at an entry of a data structure maintained by sequencer component 113. In some embodiments, the entry of the data structure can also include an indication of the portion of the memory device (e.g., the partition 314) that stores or is to store the data. The indicated portion can be a different portion of the memory device 310 that is identified by the received instruction or can be a portion of a different memory device 310 than the memory device 310 that is identified by the received instruction, in some embodiments. In other or similar embodiments, the indicated portion can be the same portion of the memory device 310 that is identified by the received instruction. Sequencer component 113 can extract the indication of the portion of the memory device that stores, or is to store, the data from the entry of the data structure, in some embodiments.

As also described above, sequencer component 113 can determine the physical channel 318 that is associated with the logical channel indicated by the received instruction based on one or more outputs of the function, in some embodiments. Sequencer component 113 can also determine a portion (e.g., a partition 314) of a memory device 310 that stores, or is to store, the data, based on the one or more outputs of the function.

At block 216, processing logic can update a memory address associated with the data to indicate at least one of the additional portion of the memory device or the portion of the additional memory device. As indicated above, sequencer component 113 can determine that the identified data channel corresponds to at least one of an additional portion of a memory device 310 that is indicated in the received instruction or a portion of an additional memory device 310 of memory sub-system 110. Sequencer component 113 can update a memory address associated with the data to correspond to the additional portion of the memory device 310 that is indicated in the received instruction or the portion of the additional memory device 310. At block 218, processing logic can initiate one or more memory access operations to access the data at a set of memory cells that correspond to the updated memory address via the identified channel.

Referring back to FIG. 3, in an illustrative example, sequencer component 113 can determine that a logical channel indicated by the received instruction corresponds to physical channel 318A. The received instruction can indicate that the data is stored at, or is to be stored at, memory cells 312 associated with partition 314B at memory device 310A. Sequencer component 113 can determine, in accordance with previously described embodiments, that physical channel 318A corresponds to partitions 314A and 314B of memory device 310A, and that the data is to be stored at memory cells 312 associated with partition 314A. Accordingly, sequencer component 113 can update an address associated with the data to indicate that the data is to be accessed at memory cells associated with partition 314A of memory device 310A and can initiate one or more memory access operations to access the data at the memory cells of partition 314A. In another illustrative example, the received instruction can indicate that the data is stored at, or is to be stored at, memory cells associated with partition 314C of memory device 310A. Sequencer component 113 can determine, in accordance with above described embodiments, that a logical channel indicated by the received instruction corresponds to physical channel 318B, and that the data is actually stored at, or is to be stored to, partition 314C of memory device 310B. Sequencer component 113 can initiate one or more memory access operations to access the data at memory cells 312 of partition 314C of memory device 310B, in accordance with previously described embodiments.

Figure 4:
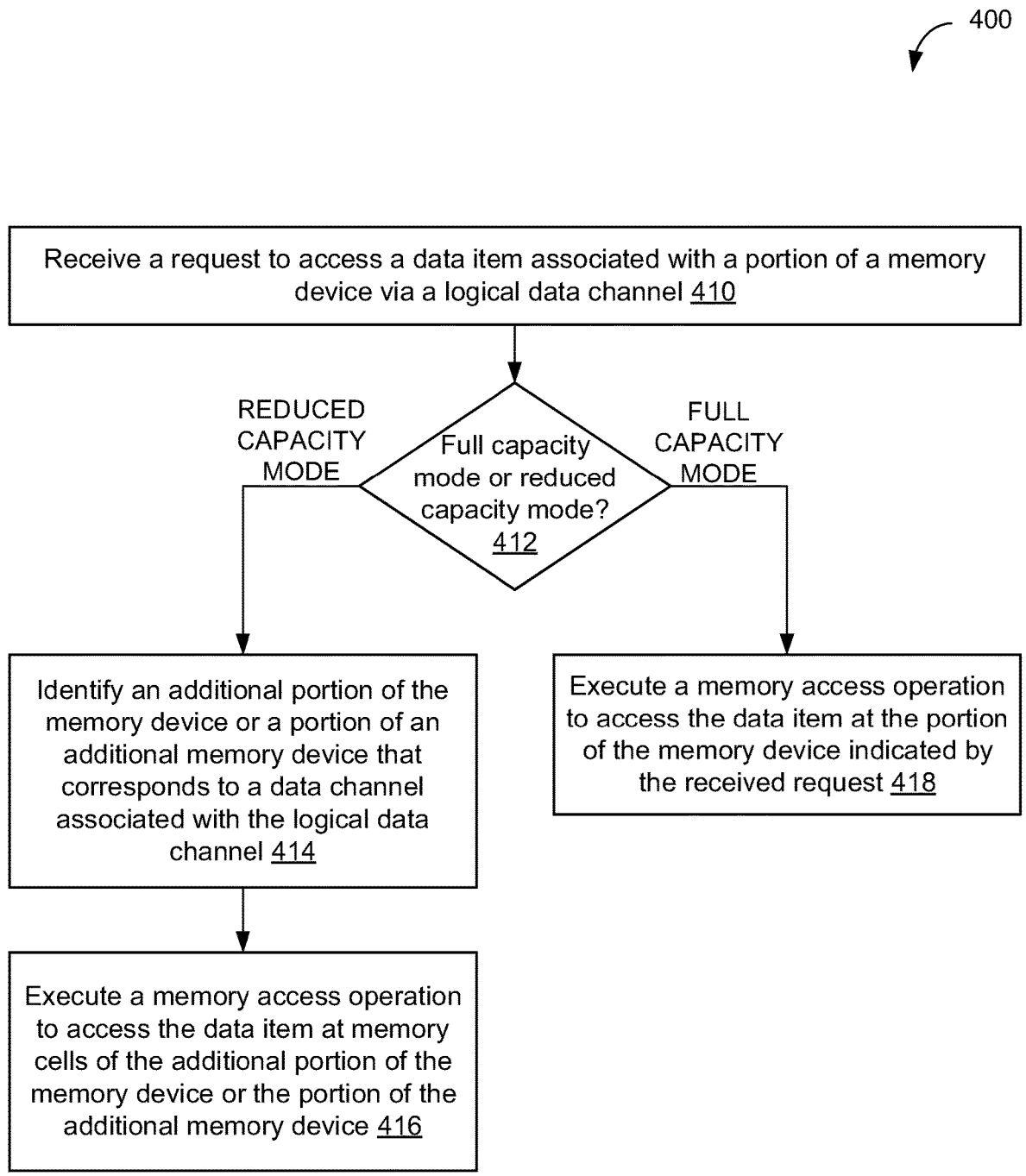
FIG. 4 is a flow diagram of another example method for accessing memory at a memory sub-system operating in a reduced data capacity mode, in accordance with some embodiments of the present disclosure.

FIG. 4 is a flow diagram of another example method 400 for accessing memory at a memory sub-system operating in a reduced data capacity mode, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the sequencer component 113 of FIG. 1. In other or similar embodiments, one or more operations of method 400 is performed by another component of the memory sub-system controller, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 410, processing logic can receive a request to access a data item associated with a portion of a memory device via a logical data channel. In some embodiments, processing logic can receive the request from a host system 120, as described above. In other or similar embodiments, processing logic can receive the request from a component of memory sub-system controller 115. At block 412, processing logic can determine whether the memory sub-system is operating in a full capacity mode or a reduced capacity mode. Responsive to processing logic determining that the memory sub-system is operating in a reduced capacity mode, method 400 may proceed to block 414. At block 414, processing logic can identify an additional portion of the memory device, or a portion of an additional memory device, that corresponds to a data channel associated with the logical data channel. Processing logic can identify the additional portion using a data structure or a function, in accordance with previously described embodiments. At block 416, processing logic can execute a memory access operation to access the data item at memory cells of the additional portion of the memory device or the portion of the additional memory device, as described above.

Responsive to processing logic determining that the memory sub-system is operating in a full capacity mode, method 400 may proceed to block 418. At block 418, processing logic can execute a memory access operation to access the data item at the portion of the memory device indicated by the received request, in accordance with previously described embodiments.

Figure 5:
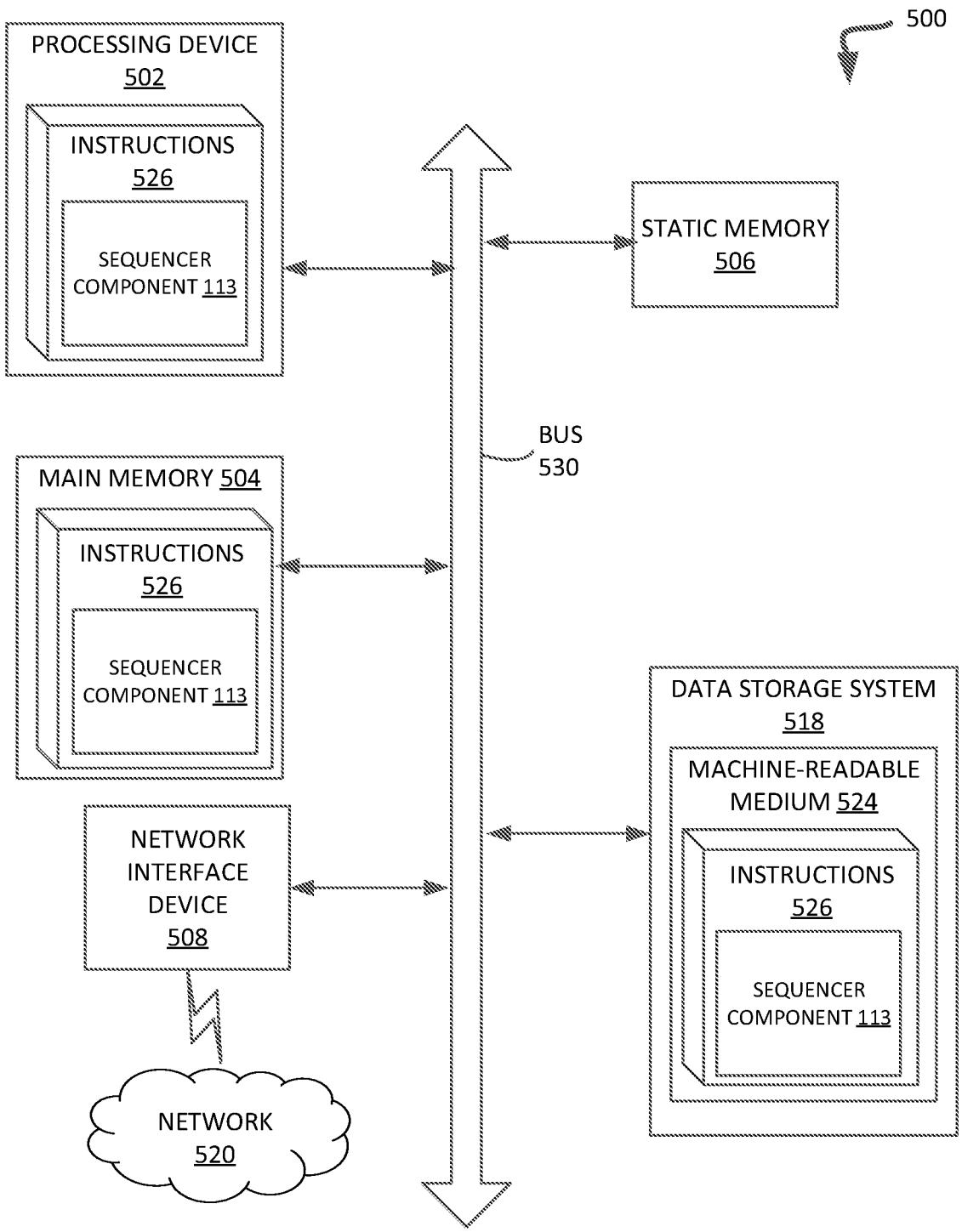
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the sequencer component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a voltage bin boundary component (e.g., the sequencer component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving an instruction to access data at a memory device of a memory sub-system via a logical data channel of a plurality of logical data channels, wherein the instruction comprises a memory address indicating a portion of a memory device associated with the data;
   identifying a data channel of a plurality of data channels that corresponds to the logical data channel, wherein the identified data channel comprises a physical channel connected to at least one of an additional portion of the memory device or a portion of an additional memory device of the memory sub-system;
   updating the memory address to indicate the at least one of the additional portion of the memory device or the portion of the additional memory device; and
   initiating one or more memory access operations to access the data at a set of memory cells that correspond to the updated memory address via the identified data channel.

2. The method of claim 1, further comprising:
   providing an identifier associated with the portion of the memory device indicated by the memory address as input to a function; and
   obtaining, as an output of the function, an indication of a portion of the memory sub-system that is connected to the identified data channel, the indicated portion corresponding to at least one of the additional portion of the memory device or the portion of the additional memory device.

3. The method of claim 1, wherein the data channel that corresponds to the logical data channel is identified based on a mapping stored at a data structure associated with the memory sub-system.

4. The method of claim 3, wherein determining that the identified data channel corresponds to the at least one of the additional portion of the memory device or the portion of the additional memory device comprises:
   extracting an indication of the at least one of the additional portion of the memory device or the portion of the additional memory device from an entry of the data structure associated with the mapping.

5. The method of claim 1, further comprising:
   determining, in view of a setting associated with the memory sub-system, that the memory sub-system is operating in a reduced capacity mode, wherein the reduced capacity mode corresponds to accessing data at a plurality of memory devices of the memory sub-system via a number of data channels that is less than the number of the plurality of logical data channels.

6. The method of claim 1, wherein the instruction to access the data at the memory device is received by a sequencer device of the memory sub-system.

7. The method of claim 1, wherein the one or more memory access operations comprise a programming operation or a read operation.

8. A system comprising:
   a plurality of memory devices; and
   a processing device coupled to each of the plurality of memory devices, the processing device to perform operations comprising:
      receiving a request to access a data item associated with a portion of a memory device of the plurality of memory devices via a logical data channel of a plurality of logical data channels;
      determining whether the system is operating in a full capacity mode or a reduced capacity mode, wherein the full capacity mode corresponds to accessing data residing at the plurality of memory devices via a number of data channels that correspond to a number of the plurality of logical data channels and the reduced capacity mode corresponds to accessing the data via a number of data channels that is less than the number of plurality of logical data channels;
      responsive to determining that the system is operating in the reduced capacity mode, identifying at least one of an additional portion of the memory device or a portion of an additional memory device of the plurality of memory devices that corresponds to a data channel that is associated with the logical data channel; and
      executing a memory access operation to access the data item at memory cells of the at least one of the additional portion of the memory device or the portion of the additional memory device.

9. The system of claim 8, wherein the operations further comprise:
   determining that the data channel is associated with the logical data channel based on a mapping stored at a data structure associated with the plurality of memory devices.

10. The system of claim 9, wherein identifying the at least one of the additional portion of the memory device or the portion of the additional memory device that corresponds to the data channel comprises:
    extracting an indication of the at least one of the additional portion of the memory device or the portion of the additional memory device from an entry of the data structure associated with the mapping.

11. The system of claim 8, wherein identifying the at least one of the additional portion of the memory device or the portion of the additional memory device that corresponds to the data channel comprises:
    providing an identifier associated with the portion of the memory device associated with the data item in the received request as input to a function; and
    obtaining, as an output of the function, an indication of a portion of the plurality of memory devices that is connected to the data channel, the indicated portion corresponding to at least one of the additional portion of the memory device or the portion of the additional memory device.

12. The system of claim 8, wherein the operations further comprise:

responsive to determining that the system is operating in the full capacity mode, executing an additional memory access operation to access the data item at the portion of the memory device.

13. The system of claim 8, wherein the memory access operation comprises at least one of programming operation to program the data item to the memory cells or a read operation to read the data item from the memory cells.

14. A non-transitory computer-readable storage medium comprising instructions that, when executed by a processing device, cause the processing device to perform operations comprising:
receiving an instruction to access data at a memory device of a memory sub-system via a logical data channel of a plurality of logical data channels, wherein the instruction comprises a memory address indicating a portion of a memory device associated with the data;
identifying a data channel of a plurality of data channels that corresponds to the logical data channel, wherein the identified channel comprises a physical channel connected to at least one of an additional portion of the memory device or a portion of an additional memory device of the memory sub-system;
updating the memory address to indicate at least one of the additional portion of the memory device or the portion of the additional memory device; and
initiating one or more memory access operations to access the data at a set of memory cells that correspond to the updated memory address via the identified data channel.

15. The non-transitory computer-readable storage medium of claim 14, further comprising:
providing an identifier associated with the portion of the memory device indicated by the memory address as input to a function; and
obtaining, as an output of the function, an indication of a portion of the memory sub-system that is connected to the identified data channel, the indicated portion corresponding to at least one of the additional portion of the memory device or the portion of the additional memory device.

16. The non-transitory computer-readable storage medium of claim 14, wherein the data channel that corresponds to the logical data channel is identified based on a mapping stored at a data structure associated with the memory sub-system.

17. The non-transitory computer-readable storage medium of claim 16, wherein determining that the identified data channel corresponds to the at least one of the additional portion of the memory device or the portion of the additional memory device comprises:
extracting an indication of the at least one of the additional portion of the memory device or the portion of the additional memory device from an entry of the data structure associated with the mapping.

18. The non-transitory computer-readable storage medium of claim 14, wherein the operations further comprise:
determining, in view of a setting associated with the memory sub-system, that the memory sub-system is operating in a reduced capacity mode, wherein the reduced capacity mode corresponds to accessing data at a plurality of memory devices of the memory sub-system via a number of data channels that is less than the number of the plurality of logical data channels.

19. The non-transitory computer-readable storage medium of claim 14, wherein the instruction to access the data at the memory device is received by a sequencer device of the memory sub-system.

20. The non-transitory computer-readable storage medium of claim 14, wherein the one or more memory access operations comprise a programming operation or a read operation.

* * * * *